(12) United States Patent
Harush

(10) Patent No.: US 8,046,340 B2
(45) Date of Patent: *Oct. 25, 2011

(54) SYSTEM AND METHOD FOR MATCHING SIMILAR MASTER DATA USING ASSOCIATED BEHAVIORAL DATA

(75) Inventor: Yossi Ben Harush, Naharia (IL)

(73) Assignee: SAP AG, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 12/862,737

(22) Filed: Aug. 24, 2010

(65) Prior Publication Data

US 2010/0312799 A1    Dec. 9, 2010

Related U.S. Application Data

(63) Continuation of application No. 11/617,573, filed on Dec. 28, 2006, now Pat. No. 7,809,696.

(51) Int. Cl.
G06F 7/04 (2006.01)
G06F 17/30 (2006.01)

(52) U.S. Cl. ........................................................ 707/692

(58) Field of Classification Search .................. 707/641, 707/692, 695
See application file for complete search history.

(56) References Cited

U.S. PATENT DOCUMENTS

| | | | |
|---|---|---|---|
| 5,845,285 A | 12/1998 | Klein | |
| 6,226,650 B1 * | 5/2001 | Mahajan et al. | 707/625 |
| 6,711,585 B1 * | 3/2004 | Copperman et al. | 1/1 |
| 6,961,721 B2 | 11/2005 | Chaudhuri et al. | |
| 6,978,270 B1 | 12/2005 | Carty et al. | |
| 7,155,427 B1 * | 12/2006 | Prothia et al. | 707/694 |
| 7,343,356 B2 * | 3/2008 | Prahlad et al. | 705/400 |
| 7,370,057 B2 * | 5/2008 | Burdick et al. | 707/692 |
| 7,401,238 B2 * | 7/2008 | Lindley et al. | 713/300 |
| 7,478,097 B2 * | 1/2009 | Emeis et al. | 1/1 |
| 7,610,342 B1 * | 10/2009 | Pettigrew et al. | 709/206 |
| 2003/0167253 A1 * | 9/2003 | Meinig | 707/1 |
| 2004/0034668 A1 | 2/2004 | Gotz et al. | |
| 2004/0107205 A1 | 6/2004 | Burdick et al. | |
| 2007/0283287 A1 | 12/2007 | Taylor et al. | |

* cited by examiner

*Primary Examiner* — James Trujillo
*Assistant Examiner* — Jorge A Casanova
(74) *Attorney, Agent, or Firm* — Buckley, Maschoff & Talwalkar LLC

(57) ABSTRACT

A system and method for identifying duplicate master data using associated behavioral data. A first record and a second record are accessed in at least one master data repository, where the first record and the second record do not share a unique field value. At least one behavior field common to a first behavior record and a second behavior record is accessed, where the first behavior record is associated with the first record and where the second behavior record is associated with the second record. At least one input parameter is obtained to configure a duplication test. The duplication test is performed between the first record and the second record based on the at least one input parameter, where the duplication test is performed on the at least one behavior field. A duplication test result is produced based on the duplication test.

19 Claims, 6 Drawing Sheets

Step 1 – configure matching parameters

Select data Repository:  Customers

Select matching Strategy:  MatchByName

Select Source systems:
S01 - SAP R\3
S02 - SAP CRM
S03 - Legacy system1
S04 - SAP SRM Select destination systems:
S01 - SAP R\3
S02 - SAP CRM
S03 - Legacy system1
S04 - SAP SRM Select transaction type:  OutGging phone calls numbers Select matching process:  Automatically match and merge all matches above threshhold ThreashHold:  ___ %

Step 2

SYSTEM AND METHOD FOR MATCHING SIMILAR MASTER DATA USING ASSOCIATED BEHAVIORAL DATA

This application is a continuation of U.S. application Ser. No. 11/617,573, filed Dec. 28, 2006 now U.S. Pat. No. 7,809,696. The patent application identified above is incorporated here by reference in its entirety to provide continuity of disclosure.

BACKGROUND OF THE INVENTION

1. Field of the Invention

Embodiments of the invention described herein pertain to the field of computer systems and software. More particularly, but not by way of limitation, one or more embodiments of the invention enable systems and methods for matching similar master data objects using associated behavioral data, for example transactional data.

2. Description of the Related Art

Businesses utilize data repositories to make business decisions. The data repositories house objects such as companies, customers, persons, products and other entities. Business decisions are best made using data that is as accurate as possible. Problems arise when data repositories contain data duplicates that should be merged into one object, but which exist as slightly different objects. Minimizing data duplications across multiple distributed enterprise-wide computer systems is difficult. Within businesses that house data in multiple data repositories, data that exists on one data repository may actually represent data in a slightly different form in another data repository. Hence, businesses attempt to merge data duplicates and utilize unified versions of business objects known as master data. Failing to keep master data objects consistent lowers the ability of an organization to leverage its data, which in turn hurts profits.

Because of the problems associated with maintaining master objects based on similar data, some companies maintain data for each corporate division in independent computational facilities and databases. Hence, the business decisions are local to a division. By utilizing multiple data repositories a business cannot leverage combined buying power to obtain lower prices from common vendors. This architecture may be maintained after a company acquisition for example. Conversely, many organizations attempt to merge their data repositories to yield unified data. Solutions that attempt to match similar fields within data records utilize word dictionaries, token-based matching, normalization rules and regular expressions. For example, "Avenue" in one record may be abbreviated as "Ave." in another record. In such a case a regular expression of "Ave.*" will match both fields. Additionally, "Dick" and "Richard" may be matches for the same data object as selected from a list of synonyms which represent a name rule. This type of de-duplication utilizes a myriad of unreliable data and therefore yields false matches and missed matches. In addition to the relatively low accuracy achieved, there is a high cost of creating and maintaining data dictionaries and rules.

Furthermore, known matching strategies tend to place a high score or weight on the physical "address" field of two objects. If two objects include a large amount of shared substrings, such as a street number or apartment number, then it is reasonable to conclude that the two objects are duplicates. Hence, most de-duplication efforts to clean and enrich master data rely heavily on the location associated with an object. The problem with this approach is that many objects are migrating to virtual environments. For example, many customers are utilizing web-based interfaces to access bills and statements. As the world becomes less reliant on physical addresses, the strength of master data de-duplication based on physical address weakens. There are no known solutions that augment de-duplication with behavior data that is independent of physical address.

In summary, existing computer systems and methods lack effective mechanisms for performing data matching in a way that allows the system to utilize actions associated with the data objects, e.g., transactional data, to determine if the data objects are or are not duplicates. Because of the limitations described above there is a need for a system and method for matching similar master data using associated behavioral data.

SUMMARY OF THE INVENTION

One or more embodiments of the invention are directed to a system and method for matching similar master data using associated behavioral data, such as for example transactional data. A duplication test is used for matching similar master data for de-duplication purposes. The accuracy of the duplication test is significantly increased by utilizing behavioral data such as transactional data. Master data records that include unique field values such as social security number fields are trivial to match. Master data records that do not include unique fields are much more difficult to match when the field values are similar but not exact.

Master data for example may include but is not limited to data objects such as a company, vendor, person or product. Master data may be thought of as nouns. Behavioral data for example may include temporal data or non-temporal data. Behavioral data is associated with master data as verbs are related to nouns. Specifically, behavioral data is data associated with an action taken by a master data object. Temporal data for example may include time and/or duration that a behavior occurred or a transaction time and/or a transaction duration. Non-temporal data may include a physical location, a product, a phone number or any other element associated with a master data object other than time.

Using behavioral data in duplication testing adds another dimension to de-duplication that is not achieved through use of master data object fields alone. In other words, the "behavior" of the master data is tested instead of testing solely on the "appearance" of the master data itself. For example, a duplication test on two "person" records having fields of "name" and "address" is greatly increased by an associated "behavior" for these "person" records, e.g., phone numbers called. In this example, if the two "person" records have associated phone transaction records that include numerous telephone calls, and none of the called numbers match, then there is a good probability that the two "person" records are not duplicates. If associated transaction records for each of the two records include numerous overlapping called numbers, then there is a high probability that the two "person" records are duplicates. If there are calls that overlap in time based on the call durations, then there is a high probability that the two "person" records are not duplicates.

Embodiments of the invention retain de-duplication accuracy even as customers and vendors rely less on physical addresses. This reliance on physical address is decreased due to increased on-line transactions and email based reporting. For example, more and more customers view bank statements and bills online without receiving paper statements at a physical address. As the amount of online activity increases and physical addresses become less and less important, the accuracy obtained via embodiments of the invention using behavior data remains stable. The de-duplication accuracy is stable since behavior data is independent of the master data such as physical address.

Behavioral data may be accessed from a transactional data repository that may or may not be integrated with the master data repository. Any architecture may be utilized that allows for behavioral data to be accessed that is associated with master data. In one or more embodiments a computer program product is utilized for matching similar master data. The computer program product uses associated behavioral data and executes in a computer usable memory medium having computer readable program code. The computer readable program code is configured to access field(s) common to master data records in a data repository and to access behavioral field(s) in another data repository and perform a duplication test. The duplication test yields a duplication test result. The duplication test result may be a Boolean value, e.g., true or false, or may be a probability of a duplicate or may be a score value or any other quantity that may be utilized to determine whether records are duplicates. The result of the duplication test may be presented to a user for confirmation, to generate a rule or may be presented to a fraud detection organization for example.

Once a set of two or more master data objects is determined to be similar, the system can merge the data objects into one master data object, group similar objects and perform further processing based on the result. Conversely, if the two master data objects are found to have behavioral data that excludes a match, then the master data objects are not combined.

In another example, given two records that are candidate duplicates, embodiments of the invention access associated behavioral records to perform a duplication test. As shown in the following table, two records include similar data as per the "name" field. Embodiments of the invention may utilize a standard duplication test to find candidate duplicates and determine whether to proceed with a duplication test as enabled herein. Alternatively, embodiments may utilize associated behavioral data in a standalone duplication test without finding candidate duplicates with a standard duplication test. In either case, accuracy of the duplication test is greatly increased through use of associated behavioral data. Specifically for two records either in one system or two disparate systems, with customer names "Elvis Presley" and "E. Presley" respectively, behavioral data is accessed to perform the duplication test.

TABLE 1

Customer Master Data

| System | Customer ID | Name | Address |
|---|---|---|---|
| S1 | 192934 | Elvis Presley | 3717 E.P. Blvd. |
| S2 | 29934 | E. Presley | Heartbreak Hotel |

In this case a behavioral data repository such as an ATM transaction database is accessed to determine if the two records have associated behaviors that would suggest or eliminate a match. The behavioral data repository may be accessed over an internal communications link or may exist outside of an organization and accessed using any electronic communication methodology for example.

TABLE 2

Customer Transaction Data

| System | Customer ID | ATM location | Amount | Transaction Time |
|---|---|---|---|---|
| S1 | 192934 | Memphis | $400 | 20061220 12:51 |
| S1 | 192934 | Memphis | $200 | 20061219 18:42 |
| S2 | 29934 | New York | $300 | 20061219 18:47 |

Since the second and third rows in the Table 2 are associated with the respective two customers in Table 1, and since these two transactions happened at roughly the same time in two different cities a duplication test using this data results in a non-match. This result signifies that the two customers in Table 1 are distinct and should not be merged into one master data object. This result would not be possible using only the master data in Table 1 itself.

In one or more embodiments input parameters are accepted by the system. The input parameters are utilized to configure the duplication test. For example, the data repository or repositories to test for similar data objects is/are accepted by the system. This may include the presentation of any type of graphical user interface element that allows the system to obtain and access a desired repository or repositories. The data repository may include a customer repository, vendor repository or products repository for example. In addition, source and destination systems that house the data repositories may also be presented in any graphical user interface elements. Systems may include CRM, ERP and/or SRM systems or any other type of source of business data.

The matching strategy to utilize within the master data repository or repositories may also be presented as a graphical user interface element. The matching strategy selection is accepted by the system and in the case of Table 1 above for example could be "match by name". Additionally, the weight given to each field match may be presented as a graphical user interface element. The match may utilize any type of pattern or rule based matching in one or more embodiments of the invention or alternatively may scan the behavioral data repository for all master data object records as a standalone application. The behavioral data repository or repositories to utilize in association with the master data repository or repositories may also be presented as a graphical user interface element.

The system accepts a selection of the behavioral data repository for use in the duplication test. The duplication test match strategy may be presented in any type of graphical user interface element. Likewise, the behavior or transaction type or types to utilize may be presented in any type of graphical user interface element, such as for example a pull-down list. Examples of transaction types include outgoing phone calls, incoming phone calls, credit card transactions, purchase orders, warehouse transactions, sales transactions or any other type of behavior. The duplication test match strategy may be "match and merge matches above a threshold" for example. Any other action taken may be utilized by the system including confirming a merge through a user interface for example.

Once the configuration parameters have been accepted by the system, embodiments perform duplication tests on similar master data. Records that may include duplicates may be displayed or may alternatively be merged automatically as per the duplication test match strategy selection. By displaying similar master data objects with behavioral data that confirms or excludes a match, a user may observe and/or confirm the duplication test result.

In one or more embodiments master data may be graphically depicted side-by-side or in a table format for example to highlight matching data. The system may show matching data in a color or weight that indicates a positive match and may likewise display non-matching data in a different color or weight which indicates data that does not exactly match. In addition, the system may also show data that "may match" using a third color and/or weight. Furthermore, for embodiments that allow for user confirmation, the system may present a confirmation graphical user interface element that allows the system to accept a user input indicative of whether the duplication match is accepted or denied for example.

The system may be utilized for example when two telephone companies merge and the customer databases contain customers that have similar master data. In this case, the system may conclude that since two customers with similar names or addresses for example call the same numbers with high frequency, that indeed the similar data should be merged into one master data object. Conversely, if no outgoing phone numbers are in common, then it can be concluded that the two similar master data records are not duplicates and should not be merged.

Any other behavioral information that is mutually inclusive or exclusive in temporal or non-temporal space may be utilized by embodiments of the invention to improve or confirm duplication tests.

BRIEF DESCRIPTION OF THE DRAWINGS

The above and other aspects, features and advantages of the invention will be more apparent from the following more particular description thereof, presented in conjunction with the following drawings wherein:

FIG. 2 illustrates a matching parameters configuration menu.

DETAILED DESCRIPTION OF THE INVENTION

A system and method for matching similar master data using associated behavioral data, such as for example transactional data, will now be described by way of example. In the following description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention are directed to a system and method for matching similar master data using associated behavioral data, such as for example transactional data. A duplication test is used for matching similar master data for de-duplication purposes. The accuracy of the duplication test is significantly increased by utilizing behavioral data such as transactional data. Master data records that include unique field values such as social security number fields are trivial to match. Master data records that do not include unique fields are much more difficult to match when the field values are similar but not exact.

Figure 1:
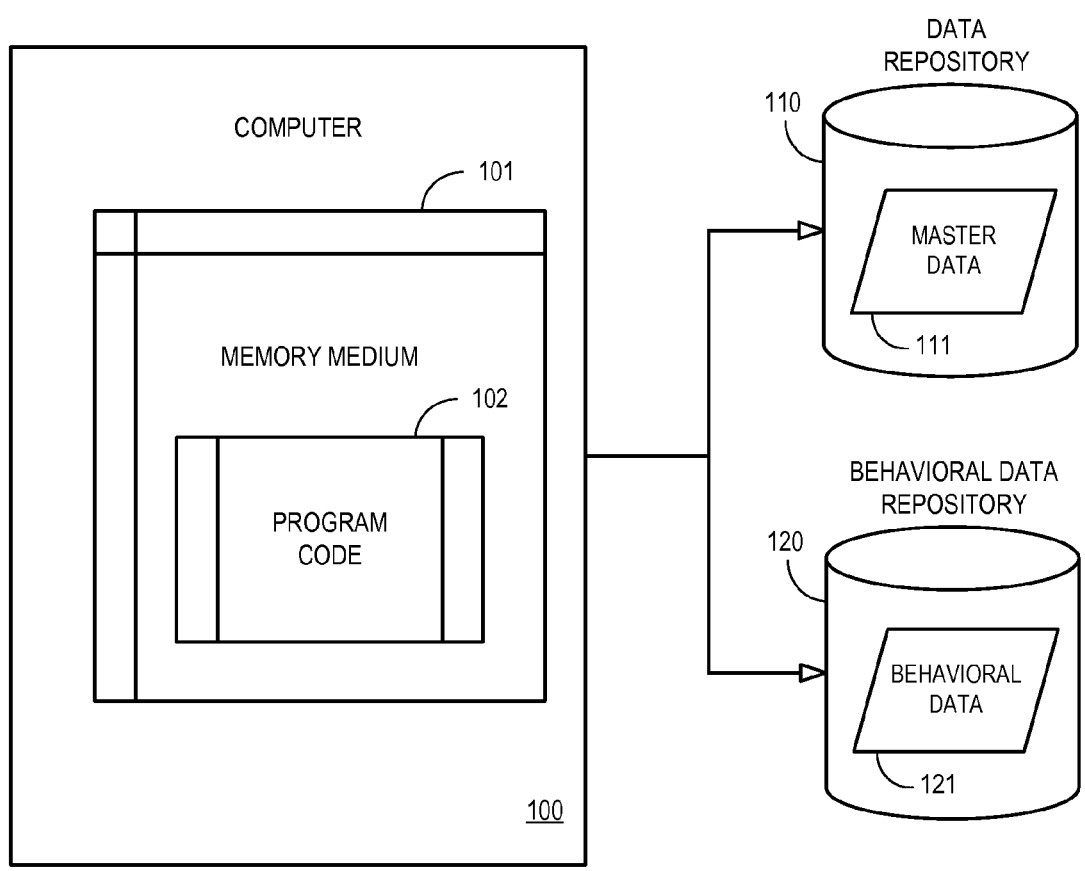
FIG. 1 illustrates a system architectural diagram.

FIG. 1 illustrates a system architectural diagram. Computer 100 includes computer usable memory medium 101 which includes computer readable program code 102 which is configured for matching similar master data using associated behavioral data. Data repository 110 houses master data 111. Behavior data repository 120 houses behavior data 121. Behavioral data 121 may be accessed from behavior data repository 120, for example a transactional data repository that may or may not be integrated with master data repository 110. Master data 111 for example may include but is not limited to data objects such as a company, vendor, person or product. Master data 111 may be thought of as nouns. Behavioral data 121 for example may include temporal data or non-temporal data. Behavioral data 121 is associated with master data 111 as verbs are related to nouns. Specifically, behavioral data 121 is data associated with actions taken by master data 111. Temporal data for example may include time and/or duration that a behavior occurred or a transaction time and/or a transaction duration. Non-temporal data may include a physical location, a product, a phone number or any other element associated with a master data object other than time. Any architecture may be utilized that allows for behavioral data 121 to be accessed that is associated with master data 111. Computer readable program code 102 may execute in one or more computers and may communicate with master data repository 110 and behavior data repository 120 over any communication network. Specifically, computer readable program code 102 is configured to access field(s) common to master data records in master data repository 110 and to access behavioral field(s) in behavior data repository 120 and perform a duplication test. The duplication test produces a duplication test result. The duplication test result may be a Boolean value, e.g., true or false, or may be a probability of a duplicate or may be a score value or any other quantity that may be utilized to determine whether records are duplicates. The result of the duplication test may be presented to a user for confirmation, to generate a rule or may be presented to a fraud detection organization for example.

Using behavioral data 121 in duplication testing adds another dimension to de-duplication that is not achieved through comparing master data records to each other alone. In other words, the "behavior" of master data 111 is tested instead of testing solely on the "appearance" of master data 111 itself. For example, a duplication test on two "person" records taken from master data 111 having fields of "name" and "address" is greatly increased by an associated "behavior" for these "person" records, e.g., phone numbers called. In this example, if the two "person" records in master data 111 have associated phone transaction records in behavior data repository 120 that include numerous telephone calls, and none of the called numbers match, then there is a good probability that the two "person" records are not duplicates. If associated transaction records for each of the two records include numerous overlapping called numbers, then there is a high probability that the two "person" records are duplicates. If there are calls that overlap in time based on the call durations, then there is a high probability that the two "person" records are not duplicates. Although in this example the "address" field is utilized, embodiments of the invention retain de-duplication accuracy even as customers and vendors rely less on physical addresses. For example, more and more customers view bank statements and bills online without receiving paper statements at a physical address. As the world becomes less reliant on physical address, embodiments of the invention continue to find duplicate master data using the behavior data associated with master data objects. Again, the behavior data exists as another dimension independent of master data fields such as physical address. Conversely, use of virtual addresses such as email addresses or URLs may be increasingly used in de-duplication efforts in one or more embodiments of the invention.

When two or more master data objects in master data repository 110 are determined to be similar, the system can merge the data objects into one master data object, group similar objects and perform further processing based on the result. Conversely, if the two master data objects are found to have behavior data 121 that excludes a match, then the master data objects are not merged.

FIG. 2 illustrates a matching parameters configuration menu. In one or more embodiments a graphical user interface element is present to allow for input parameters to be entered and accepted by the system. The input parameters are utilized to configure the duplication test. For example, the data repository or repositories to test for similar data objects is/are accepted by the system. As shown in FIG. 2, a master data repository named "Customers" is configured for a duplication test. Displaying a data repository input graphical user interface element may include the presentation of any type of graphical user interface element that allows the system to obtain and access a desired repository or repositories. The data repository may include a customer repository, vendor repository or products repository for example.

The matching strategy to utilize within the master data repository or repositories may also be presented as a graphical user interface element. The matching strategy selection is presented and accepted by the system and in the case of FIG. 2 has been presented and set, programmatically or by a user, to "MatchByName". Optionally, more than one field may be tested to produce candidate matches and a weight may for example be given to each field match. The weights may be presented in any type of graphical user interface element and is not shown for brevity. The match may utilize any type of pattern or rule based matching in one or more embodiments of the invention or alternatively may scan the behavioral data repository for all master data object records as a standalone application. The behavioral data repository or repositories to utilize in association with the master data repository or repositories may also be presented as a graphical user interface element.

In addition, source and destination systems that house the data repositories may also be presented in any graphical user interface elements. Systems may include CRM, ERP and/or SRM systems or any other type of source of business data. As shown in FIG. 2 multiple source and destination systems are presented for selection including "S01" through "S04" which represent various types of systems utilized by one or more embodiments of the invention.

The system accepts a selection of the behavioral type or alternatively a behavioral data repository for use in the duplication test and as shown "outgoing phone call numbers" has been presented and selected. Additionally, the duplication test match strategy may be presented in any type of graphical user interface element. Likewise, the behavior or transaction type or types to utilize may be presented in any type of graphical user interface element, such as for example a pull-down list. Examples of transaction types include outgoing phone calls, incoming phone calls, credit card transactions, purchase orders, warehouse transactions, sales transactions or any other type of behavior. The duplication test match strategy may be "match and merge matches above a threshold" for example as is presented and selected in FIG. 2. Any other action taken may be utilized by the system including confirming a merge through a user interface for example. A threshold percent input may be optionally presented as is shown as the lowest input parameter element in FIG. 2. Any other type of input may be utilized in other embodiments of the invention to present and accept inputs including but not limited to Boolean, scores or any other type of quantity.

Figure 3:
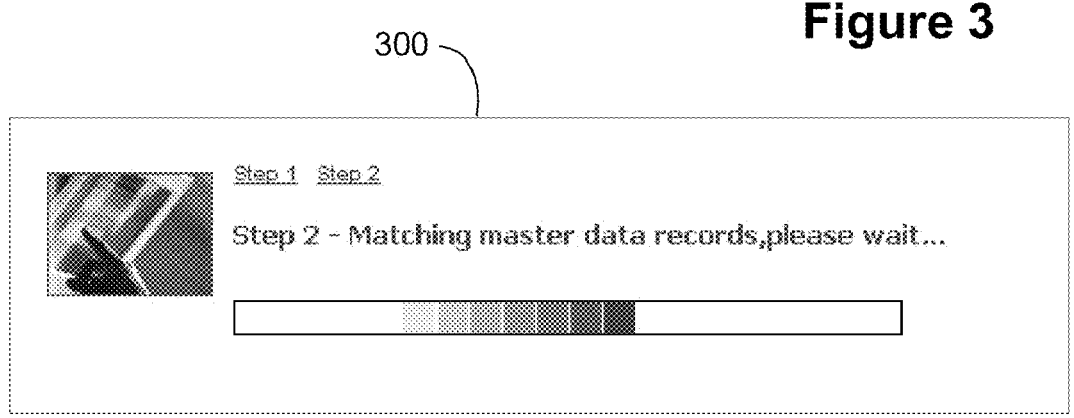
FIG. 3 illustrates a status dialog showing an execution of an embodiment of the invention.

FIG. 3 illustrates a status dialog showing an execution of an embodiment of the invention. The system is not required to display any type of status however for large data sets this status dialog ensures any observing user that the system is working on the duplication test. This dialog allows for the system to display a status with respect to the amount of records scanned or the percentage of completion of the overall duplication test process or any other status associated with processing. Any graphical user interface element may be utilized for this purpose.

Figure 4:
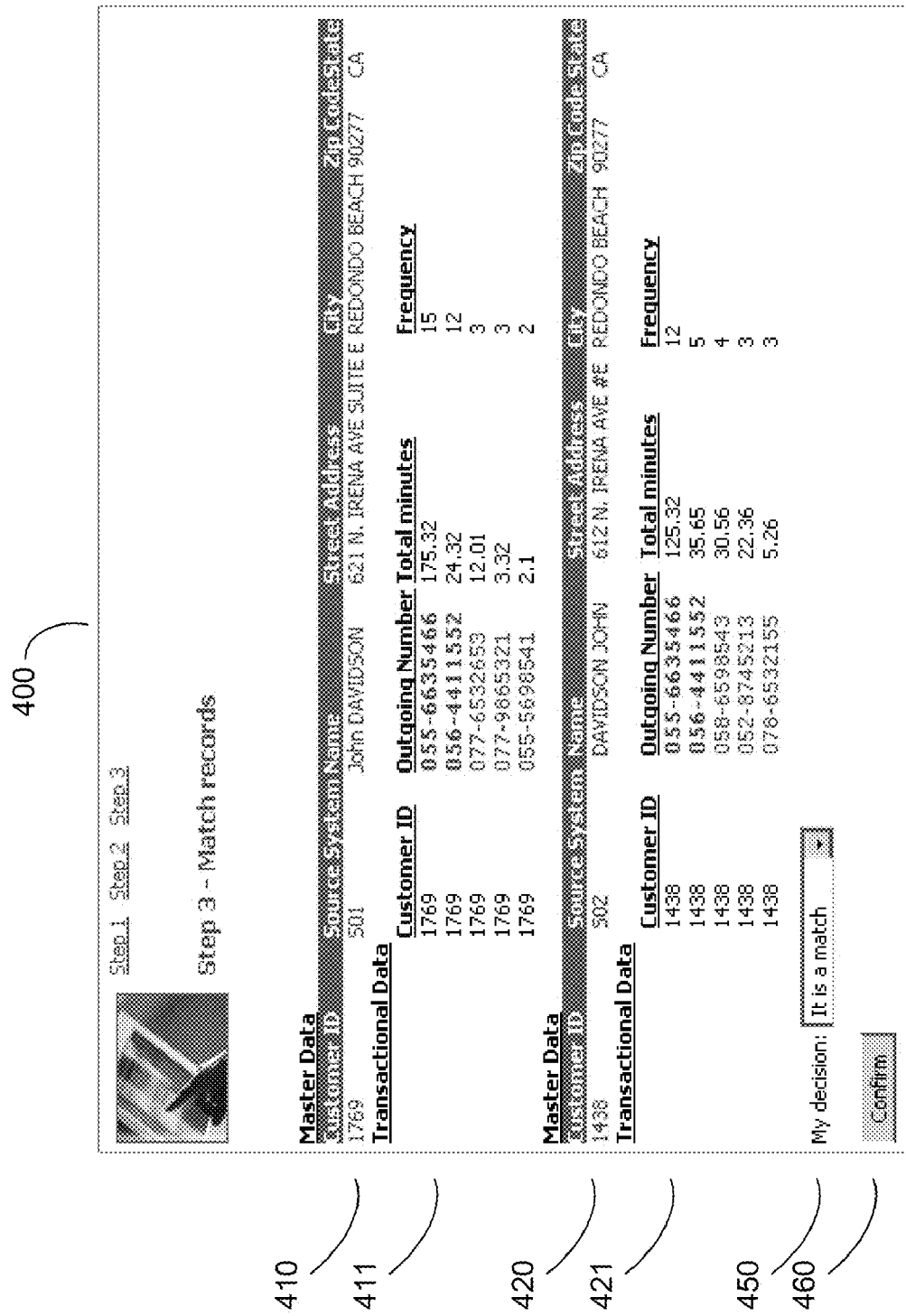
FIG. 4 illustrates a match result showing common behavior data.

FIG. 4 illustrates a match result showing common behavior data. In this example, two master data records 410 and 420 are candidate duplication matches. The method for determining that master data records 410 and 420 are candidate duplication matches may include any standard rule based or pattern or sub-pattern matching algorithm or may include embodiments of the invention to scan behavior data. In this case, sub-pattern portions of the "name" and address fields match and the "city", "state" and "zip code" fields match exactly. Regardless of the method for determining candidate matches, behavior data records 411 and 421 associated with master data records 410 and 420 respectively are compared. In this case, since the top two phone numbers, "055-6635466" and "056-4411552" are common to both behavior data record sets 411 and 421 associated with master data records 410 and 420, master data records 410 and 420 have a high probability of a match. The embodiment shown in FIG. 4 presents decision field 450 for accepting input from a user regarding the match decision. In one or more embodiments the system may utilize scores, or rules to automatically set the duplication test result without presenting decision field 450. In addition, the system in the embodiment shown in FIG. 4 also presents a "confirm" graphical user interface element that allows for the system to accept user acknowledgement of viewing the data and entering a decision value. Although the example shown is basic in nature, other behavior data may augment or be utilized. For example, telephone call start time and duration may be utilized in the duplication test as temporal values that allow for the determination of temporal overlap of two calls. For example if one or more of the calls to number "055-6635466" in behavior data records 411 was to overlap in time with one or more calls in behavior data records 421, then the overall probability of a duplication match may lower since customers associated with master data records 410 and 420 may be less likely to perform simultaneous calls. Alternatively with other non-temporal behavior data such as location, if the behavior data shows that two transactions occur in two different cities at approximately the same time, then the master data records may be flagged as non-matches.

Figure 5:
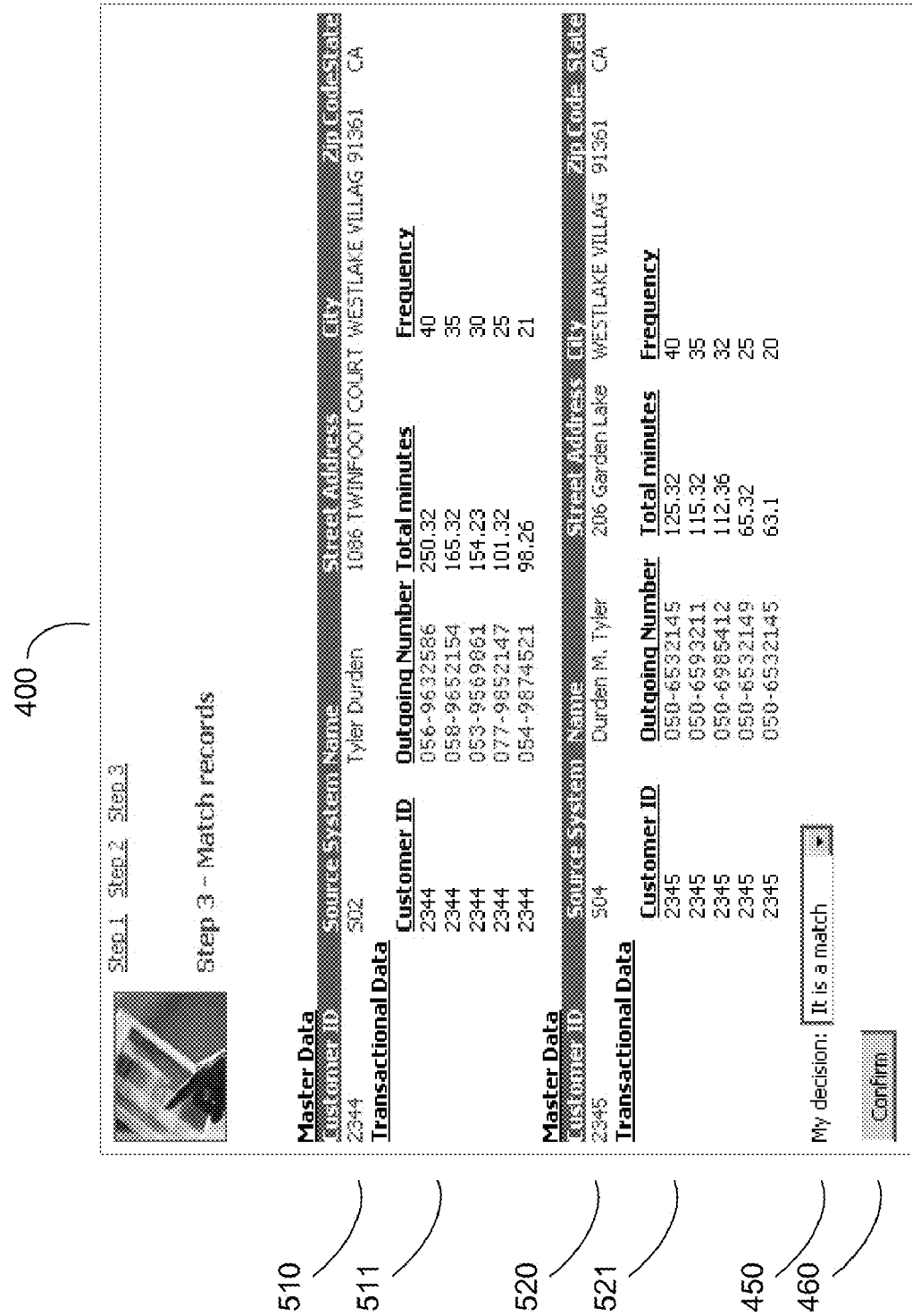
FIG. 5 illustrates a match result showing no common behavior data.

FIG. 5 illustrates a match result showing no common behavior data. In this example, master data records 510 and 520 show no common calls made. In the case of a merger between two telephone companies, the two customers would not be merged into a single master data object since the probability that master data records 510 and 520 represent the same person is low. In this case non-temporal data overlap does not exist and hence checking for temporal overlap is not needed. Any method of master data duplication testing that includes use of behavior data is in keeping with the spirit of the invention regardless of method of comparing temporal and non-temporal behavior data.

Figure 6:
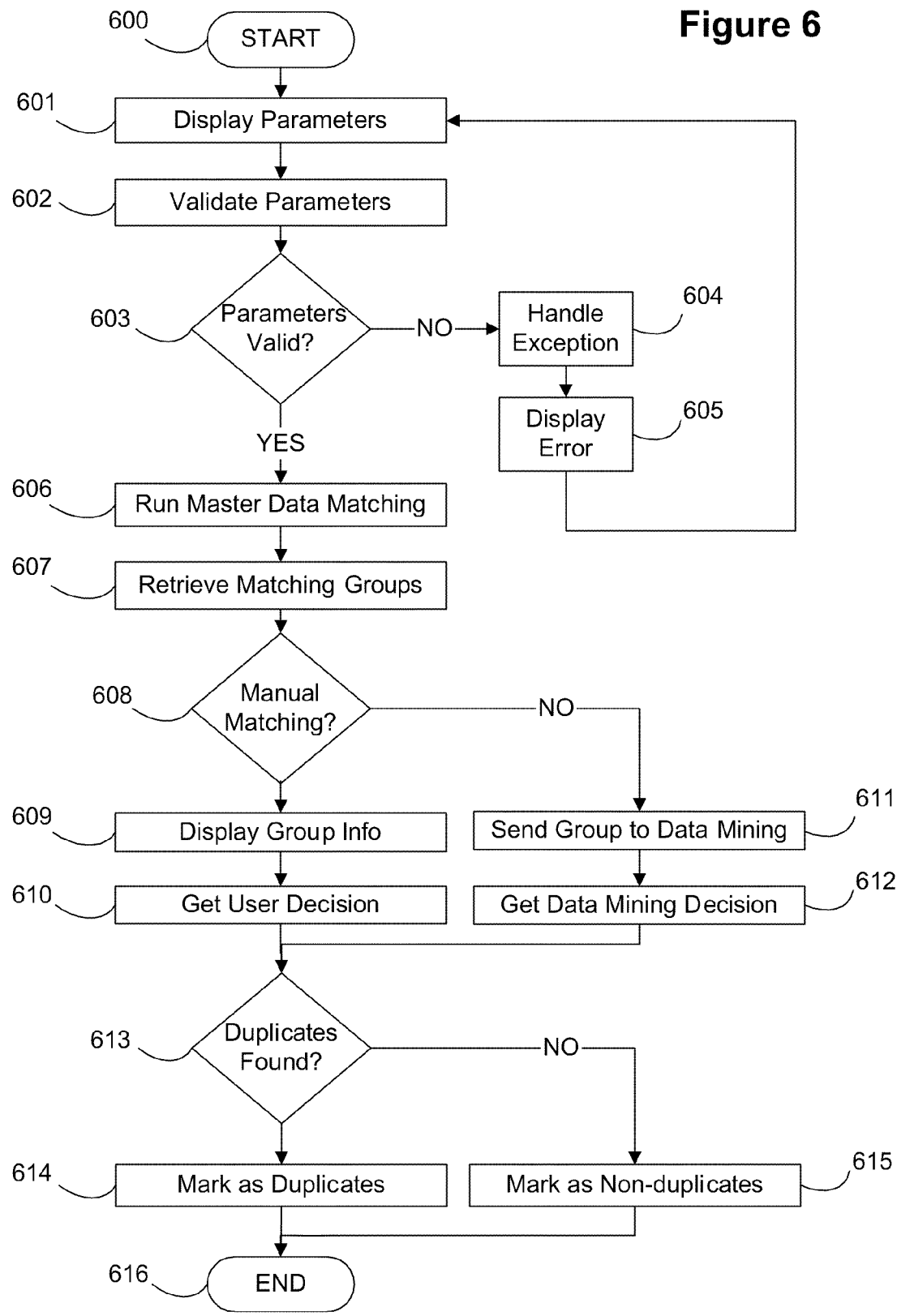
FIG. 6 illustrates a flow chart of an embodiment of a method for matching similar master data.

FIG. 6 illustrates a flow chart of an embodiment of a method for matching similar master data. Processing starts at 600. The system displays parameters for configuring the duplication test at 601. One embodiment for performing this step is shown in FIG. 2. The parameters input are validated at 602. Validating the parameters may include checking whether the selected systems or algorithms are available for example. Any type of validation test may be utilized with input parameters. If the parameters are not valid at 603, then the system handles the exception at 604 and displays the error at 605 for the user to correct. Processing continues at 601 where the corrected parameters are entered for example.

If the parameters are valid at 603, then processing continues to 606 where master data matching is performed to find candidate groups of master data records that may be duplicates. One embodiment for performing master data matching includes accessing at least one field common to master data records in a master data repository; accessing at least one field common to a behavior record associated with respective master data records wherein enough of the master data matches between two records to warrant a duplication test comparison using the associated behavior records.

With the system searching for candidate duplicates, the status display of FIG. 3 may be optionally displayed. When master data matching find candidates matches which may include two or more records that are possible duplicates, these groups of records are returned at 607. A duplication test is performed manually or automatically. If the system is configured for manual matching at 608 then a set of candidate matches is displayed as a group of records at 609. Displaying a group of records that are possible duplicates is shown in FIG. 4 for example. A user reviews the information by viewing common master data and common behavior data, for example through color coding of common data. The system gets the user decision at 610. Any type of graphical user interface element may be utilized to obtain the user decision. Alternatively, if the system is configured for automatic matching, then the group of matching records is sent to the data mining code set at 611. The data mining code set decides whether the master data records are duplicates based on any temporal or non-temporal behavior data associated with each master data record. Any algorithm for comparing behavior data associated with master data records is in keeping with the spirit of the invention including rule-based, neural net based, weighted scored based or any other algorithm.

Any method of signifying the duplication test result is in keeping with the spirit of the invention including marking the master data records as duplicates or non-duplicates. If any duplicates are found at 613 then the master data records are marked as duplicates at 614. Otherwise, the master data records are marked as non-duplicates at 615. Processing ends at 616, if there are more data records to process, then the system may optionally continue processing at 606 or if data matching at 606 produces a global set of candidate matches, then processing may continue optionally at 609 or 611 respectively. Any other sequence of steps that allows for the processing of the entire set of master data records that is not shown for brevity in FIG. 6 is in keeping with the spirit of the invention as one skilled in the art will recognize. The system may merge duplicates into a smaller set of master data records, or alternatively may keep the master data records duplicates in separate records and record the duplication test results for the matching records.

While the invention herein disclosed has been described by means of specific embodiments and applications thereof, numerous modifications and variations could be made thereto by those skilled in the art without departing from the scope of the invention set forth in the claims.

What is claimed is:

1. A computer program product for identifying duplicate master data using associated behavioral data comprising a tangible computer-readable medium encoded with computer readable instructions that, when executed by at least one processor, causes said at least one processor to:
    access a first record and a second record in at least one master data repository, wherein said first record and said second record do not share a unique field value;
    access at least one behavior field common to a first behavior record and a second behavior record, wherein said first behavior record is associated with said first record and wherein said second behavior record is associated with said second record, and further wherein said first behavior record and said second behavior record comprise behavior data in at least one behavior data repository;
    obtain at least one input parameter to configure a duplication test;
    perform said duplication test between said first record and said second record based on said at least one input parameter, wherein said duplication test is performed on said at least one behavior field and at least one field common to said first record and said second record; and,
    produce a duplication test result based on said duplication test.

2. The computer program product of claim 1, wherein said at least one input parameter comprises at least one data repository identifier identifying said at least one master data repository comprising said first record and said second record.

3. The computer program product of claim 1, wherein said at least one input parameter comprises a behavioral data repository identifier identifying at least one behavior data repository comprising said first behavior record and said second behavior record.

4. The computer program product of claim 1, further comprising a graphical user interface configured to display a plurality of potential input parameters to a user, wherein said plurality of potential input parameters comprise said at least one input parameter obtained to configure said duplication test.

5. The computer program product of claim 1, wherein said computer readable instructions further cause said at least one processor to obtain a matching strategy, wherein said duplication test is performed based on said matching strategy.

6. The computer program product of claim 5, wherein said matching strategy identifies at least one selected behavior field, wherein said duplication test is performed based on said at least one selected behavior field.

7. The computer program product of claim 6, wherein said at least one input parameter further comprises at least one weight associated with said at least one strategy behavior field, wherein said duplication test is performed based on said at least one weight.

8. The computer program product of claim 5, wherein said matching strategy utilizes rule-based matching.

9. The computer program product of claim 5, wherein said matching strategy utilizes pattern-based matching.

10. The computer program product of claim 1, further comprising a graphical user interface configured to display a plurality of behavior fields common to said first behavior record and said second behavior record, wherein said matching strategy is based on at least one behavior field selected by a user.

11. The computer program product of claim 1, wherein said computer readable instructions further cause said at least one processor to obtain a matching process comprising an action to perform on said first record and said second record based on said duplication test result, wherein said computer readable instructions further cause said at least one processor to perform said action based on said duplication test result.

12. The computer program product of claim 11, wherein said computer readable instructions further cause said at least one processor to obtain a threshold associated with said matching process, wherein performance of said action is based on a comparison of said duplication test result and said threshold.

13. The computer program product of claim 1, wherein said at least one input parameter comprises a transaction type selection associated with at least one behavior field common to said first behavior record and said second behavior record.

14. The computer program product of claim 1, wherein said behavioral data comprises online transactions and online activities.

15. A computer implemented method for identifying duplicate master data using associated behavioral data comprising:
 obtaining a matching strategy selection;
 obtaining a data repository selection associated with a master data repository comprising a plurality of data objects;
 obtain a transaction type selection comprising at least one type of behavioral data;
 accessing a plurality of records from said master data repository;
 accessing a plurality of behavior records comprising at least one behavior field associated with said transaction type selection, wherein said plurality of behavior records comprise behavior data in at least one behavior data repository;
 performing a duplication test on said plurality of records based on: (i) said plurality of behavior records, (ii) said at least one behavior field associated with said transaction type selection, and (iii) at least one field common to said plurality of records; and
 producing at least one duplication test result indicating a likelihood that two or more of said plurality of records that do not share a unique field value refer to the same data object.

16. The computer implemented method of claim 15, further comprising:
 obtaining a matching process selection comprising at least one action to be performed on at least one of said plurality of records based on said duplication test result; and
 performing said at least one action on said at least one of said plurality of records.

17. The computer implemented method of claim 16, further comprising obtaining a threshold, wherein said at least one action is performed based on a comparison of said duplication test result and said threshold.

18. The computer implemented method of claim 16, wherein said action comprises merging at least two records into one record associated with a master data object based on said at least one duplication test result.

19. The computer implemented method of claim 16, further comprising presenting a graphical user interface to a user comprising a plurality of potential data repositories comprising said data repository selection, a plurality of potential matching strategies comprising said matching strategy selection, a plurality of potential transaction types comprising said transaction type selection, and a plurality of potential matching processes comprising said matching process selection.

* * * * *